Figure 1:
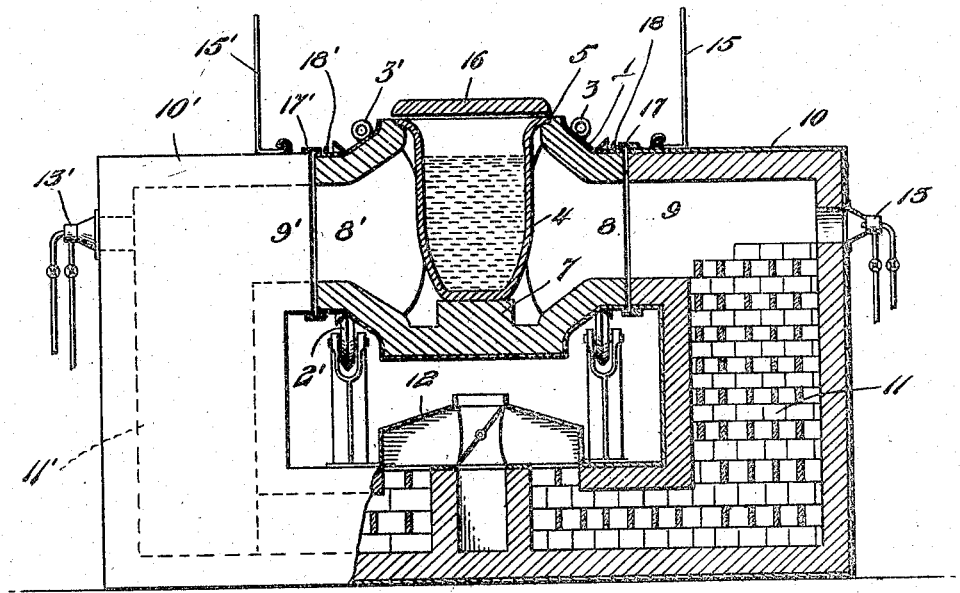

W. M. CARR & C. H. SPEER.
MELTING APPARATUS.
APPLICATION FILED NOV. 2, 1908.

936,759.

Patented Oct. 12, 1909.

Witnesses

Inventors
William M. Carr
and
Charles H. Speer,
K. P. McElroy
Attorney

UNITED STATES PATENT OFFICE.

WILLIAM M. CARR, OF NEW YORK, N. Y., AND CHARLES H. SPEER, OF CHESTER, PENNSYLVANIA.

MELTING APPARATUS.

936,759.  Specification of Letters Patent.  Patented Oct. 12, 1909.

Application filed November 2, 1908. Serial No. 460,753.

*To all whom it may concern:*

Be it known that we, WILLIAM M. CARR and CHARLES H. SPEER, citizens of the United States, residing at New York, in the county of New York and State of New York, and at Chester, in the county of Delaware and State of Pennsylvania, respectively, have invented certain new and useful Improvements in Melting Apparatus, of which the following is a specification.

This invention relates to melting apparatus; and it comprises a melting vessel mounted in a revoluble or tiltable furnace casing having means for producing therein and around said melting vessel substantially continuously a homogeneous, substantially unstratified and evenly burning flame supplied with recovered heat, said melting vessel and casing together constituting a ladle all as more fully hereinafter set forth and as claimed.

In fusing metals and the like high-melting substances by transmitted heat in crucibles and like vessels, a number of practical difficulties are encountered. Such vessels must of course be made of refractory materials like fireclay, graphite, etc., and their heat-transmitting qualities are not ordinarily very good, necessitating the maintenance of a high "heat head," externally to insure the transmission of efficient quantities of heat in a time unit. That is, the temperature differential, the difference between internal and external heat, must be maintained at a high degree. If steel is to be melted, the temperature outside the crucible must be much higher than the melting point of steel to insure efficient and quick transmission of heat through the crucible walls. Graphite, plumbago, and the various artificial carbons and carbids are tolerably efficient in transmitting heat, but for mechanical reasons they are rarely used alone, being generally reinforced by fireclay. And the resistance to the transmission of heat increases more than proportionately to the amount of fireclay employed.

In melting steel and other high-melting materials, it is of course necessary ultimately to transfer the fused material to ingot molds, ladles or other receivers, and this, in the ordinary practice, necessitates more or less handling of the crucibles, as in removing from the furnace, pouring, etc. For this reason, such crucibles must be made stronger, i. e., thicker, than is necessary merely to withstand the weight of the contained fluid metal, etc. But additional thickness increases the difficulty of heat transmission; as does also the use of higher percentages of fireclay and other strong refractories in the composition of which the crucibles are made. Furthermore, because of this difficulty in heat transmission, the heating of such crucibles offers considerable difficulty also since unevenness in heating causes a tendency to crack and break; this tendency being the cause of the short life of such crucibles. Naturally, the stronger and thicker they are, the greater is this tendency.

In practice, direct firing by a grate fire, by surrounding solid fuel or by an impinging flame from a burner is found to be more destructive to the crucible than the evener heat of regenerated flames, such as are produced in the ordinary types of regenerative and recuperative furnaces. And as it is generally believed that this type of furnaces cannot be used in small sizes, it being thought that a certain length of flame travel in the furnace is required to produce efficient combustion therein and prevent too much combustion taking place beyond in regenerative checkers, etc., while for mechanical reasons crucibles for steel, brass, etc., must be rather small, it is the custom to employ a battery of such crucibles set in a single furnace, the crucibles being bodily removed when it is necessary to pour. This of course means the use of thick, strong crucibles which can be picked up and handled by tongs and the like without crushing or breaking. In such large furnaces, accommodating a battery of crucibles, the heating, while much more uniform than with direct firing, is still not as uniform as is to be desired. Combustion, at least as regards velocity, depends much upon the relation of the flame gases to solid materials, such as the roughened surfaces of the refractories which form furnace walls and also upon the temperature to which the flame gases are brought by radiation from such walls. As radiation diminishes as the square of the distance, the effective radiation, for this purpose, extends only over a distance of a foot or so from the walls. In a large furnace, having a diameter of a number of feet, therefore, the flame body (which is rarely large enough to fill the barrel of the furnace) is generally more or less stratified, there being a quickly burning flame layer of high temperature next the roof and slower-burning layers therebelow, these underlying layers requiring the length of travel afforded by a large furnace to complete their combustion prior to reaching the checkers. The high-temperature flame layer being very much lighter than the other gases, offers a positive resistance to the latter reaching the roof by vortical movements. In the effort to quicken combustion, and thereby raise the temperature degree, it is consequently customary to use undue excesses of air; an excess of air much quickening combustion. Such a large excess however acts to promote stratification of the flame body. Heating in such large furnaces is therefore not as uniform as is to be desired. And if the crucibles be standing on the hearth, the contents are exposed to flame gases and oxidation by air strata, while if, as is frequently the case, they be set in the roof, they must withstand the unsupported weight of the metal contained or the furnace chamber must be obstructed by piers, while there must be a surrounding space to allow handling at the point where they pass through the roof; and such space allows emission of flame gases or entrance of air, according to whether the chamber runs under plus or minus pressure.

In the present invention, it has been the effort to devise a cheap, simple and efficient type of melting apparatus obviating the stated disadvantages and offering a number of new advantages. It has been discovered that by very materially reducing the dimensions of the furnace chamber so that contained flames are at no point more than a foot or so distant from a hot, heat-radiating, catalytically acting refractory furnace wall, it is possible to produce a new type of regenerated flame, burning with great velocity (and consequent intense elevation of temperature) throughout its mass and completing its combustion in a short distance of travel and without the use of a large excess of air and without stratification. In a typical regenerative furnace of this type (having a capacity, say, of about 500 to 750 pounds) it is possible to melt steel with a consumption of fuel oil of about 20 gallons per ton whereas with the ordinary large furnaces holding from 5 to 50 tons, 35 to 40 gallons per ton are considered good practice. The average temperature within the chamber is very materially higher. These results are somewhat unexpected, it being usually considered that economy increases with the size, the losses of heat by air-cooling of exterior walls per cubic foot of chamber volume of course decreasing with increase in size of the chamber. In producing this type of heating, combustible and hot air must of course be thoroughly admixed prior to entry into the furnace chamber. Within the chamber, the body of flame must be of limited diameter and volume and must be freely exposed to the radiating effects of hot walls at a limited distance from any point within such diameter. Under these conditions, the radiation promotes quick and uniform combustion and, the flame being of small diameter, all portions of the flame are given a possibility of wall contact by vortical motions within a comparatively short distance of travel; both effects coöperating to produce quick combustion and high temperature. The excess of air employed should be cut down to but little above theory, both for the sake of economy and to prevent stratification. Such an excess is not needed with this type of furnace. A regenerative furnace of this character is particularly adapted to modification to produce a new type of crucible and ladle furnace, since the furnace chamber, being but small, may be made portable and transportable and the melting chamber or crucible permanently secured thereinto, so that the two together form one structure, being portable and transportable as a unit, or, practically, forming a ladle. With this small diameter furnace, small, thin-walled crucibles, such as are needed in metal-casting work may be used, inserted so as to completely span the chamber while resting on its bottom. With such a structure, the melting chamber, not having to withstand handling and transportation *per se*, may be made quite thin and heat conductive, thereby both increasing the speed of melting and the life of the container itself. And since the crucible is within and spans the furnace chamber, it offers an additional refractory wall to increase combustion.

With the described type of combined furnace chamber and metal-melting container, together forming a ladle, of a transportable nature, a plurality of such devices may be employed with the same regenerative heating means, the ladles being used in succession.

In the accompanying illustration is shown, more or less diagrammatically, one of the many possible embodiments of the described invention.

Figure 2:
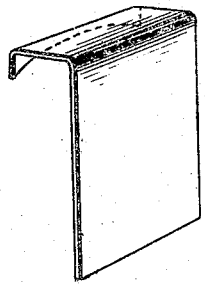

In this showing, Figure 1 represents a vertical section of the apparatus, and Fig. 2 is a detail view showing a closure for the furnace chamber.

Element 1 represents a comparatively small short and narrow furnace chamber of rounded cross section, mounted on and revoluble on rollers 2 and 2'. On the side which is normally uppermost, it is provided with attaching means 3 and 3' for cranes or the like, and has a central orifice through which extends melting vessel 4, shown as crucible shaped, though it may have another shape. Into this orifice the vessel fits comparatively snugly, and it may be luted thereto. The vessel may furthermore be provided with flange 5 overhanging the joint. These means prevent air passing into the chamber or gases passing outward, and thereby also prevent violent and irregular temperature changes around the vessel as well as possible contamination of its contents by fire gases. The whole chamber may have, and advantageously has, a surrounding steel casing 6 to give it mechanical strength. Within the chamber may be a pier or base 7 on which to mount the container. The container may be fireclay, graphite, or other refractory material, or, if intended for low-temperature operations, it may be of iron or other material. The furnace chamber may be of refractory material molded into form, as by stamping moist refractory material into the chamber casing and baking; or it may be made of suitable shaped and assembled bricks or tile. Any refractory material such as clay, magnesite, chromite, graphite, etc., may be used.

As shown, the chamber is provided with a pair of ports, one at each end, for engaging corresponding elements of regenerators. This tubular chamber with open port-forming ends is very convenient for the present purpose as permitting rotation. The ports, respectively lettered 8 and 8′, when the chamber is in melting position engage similar ports 9 and 9′ of a pair of regenerative devices 10 and 10′. As shown, these regenerative devices are of a single, air-heating type, though double regenerators for gas firing may be substituted. Each regenerator comprises the ordinary checkers (respectively 11 and 11′) communicating with a stack (not shown) through an ordinary type of reversing valve mechanism, 12. Above each checker is an oil burner (13 and 13′), set so as to produce an oil spray permeating the whole body of air ascending from the checkers and thereby forms a homogeneous flame. It is not desirable to set the fuel introducing means in any way which will tend to produce a stratified flame within the furnace chamber, since stratification will lead to uneven heating and loss of economy in heating while being detrimental to the crucible. The ordinary superimposed air and fuel ports leading to the furnace chamber should therefore be avoided.

The operation of the structure shown is obvious from the foregoing. The checkers 11 and 11′ are alternately in heat-absorbing and heating-up phase, alternately supplying superheated air and removing waste gases. Considering 11 as absorbing heat, air coming from the reversing valve mechanism ascends through 11′ and in an intensely heated state meets and is mixed with the sprayed oil from 13′. The produced flame body, which is of comparatively small cross-section, is brought into a state of intense and uniform combustion throughout its cross-section, first by the heat-radiating and catalytic effect of the near-by refractory walls of port or passage 9′ and then by the walls of the narrow furnace chamber, eddying and vortical actions in this narrow flame body producing good commixture and homogeneity and efficient contact with the combustion-accelerating refractory materials of the walls. Such refractories in the described type of furnace are of course within efficient radiating distance of every plane of the flame. After the first heating up, the refractory material of the crucible or container acts as a hot refractory wall in the same manner as the walls of the chamber proper and also acts to produce vortical movements in the flame body. And by the time the flame gases have traveled as far as 8 in a chamber which may not be more than a couple of feet long, combustion will be complete with evolution of all the heat which will be produced. The intensely hot products of combustion pass through checker 11 in the ordinary manner, heating it up. In the next reversal, 11 yields up its stored heat to entering air while 11′ stores heat from products of combustion.

With a homogeneous flame of the kind described, free from stratification or layers of cooler air or gases, the heating of the crucible is very uniform and its life is consequently prolonged. As the crucible itself is not handled *per se*, it may be quite thin-walled. This not only promotes quick heating of the contained metal but also adds to the life of the crucible as diminishing the liability to destructive expansion and contraction stresses.

After a melt is completed, the vessel may be poured by simply rotating the chamber on its axis a quarter turn; or the chamber may be picked up by a crane and carried to a point of use for molten metal prior to such pouring.

In transportation, since it is desirable to prevent access of cold air to the interior of the chamber, both to prevent loss of heat and to avoid cracking or checking the container, the chamber may be provided with a couple of flap closures, 14 and 14′, adapted to be placed over the open ports and supported from lugs 18 when the chamber is removed from the regenerative apparatus. In the absence of the chamber, similar closures 15 and 15′ may be swung over the open ports of the regenerators, if a similar chamber be not at once slipped into place. Fig. 2 shows one of these flap closures, 14.

By reason of the hotter, more homogeneous flame in this apparatus, as well as by reason of the thinner melting vessels which it is possible to use, melting is a much speedier operation than in the ordinary types of regenerative furnace, and the consumption of fuel is much less.

Preferably, as shown, the ports 8 and 9 are spaced apart a little to prevent actual contact in engagement. Rings 17 and 17' may be used to cover the openings thus formed. A cover 16 may be used with the melting vessel.

What we claim is:—

1. A melting apparatus comprising a short and narrow furnace chamber having refractory walls within effective radiating reach of all points within such chamber, a container for fluid metal set within such chamber and direct connected regeneratively supplied firing means for such chamber, adapted to deliver and maintain a homogeneous flame body therein.

2. A melting apparatus comprising a revoluble narrow furnace chamber of generally tubular shape and having refractory walls within effective radiating reach of all points within such chamber, means for turning said chamber, a container for fluid metal set within such chamber and extending through one such wall and spanning such chamber, and direct connected regeneratively supplied firing means for such chamber adapted to produce a continuous supply of substantially unstratified homogeneous flame therein.

3. A ladle furnace comprising a small diameter furnace casing having walls of refractory material within effective radiating reach of all points within such chamber, means for transporting and for tilting such chamber, a container for fluid metal set within and spanning the chamber and extending through one wall, and direct connected regeneratively supplied firing means adapted to engage ports in said chamber when said chamber is in position and produce and maintain a continuous, substantially unstratified and homogeneous flame therein.

4. A ladle furnace comprising a revoluble small-diameter furnace casing having walls of refractory material within effective radiating reach of all points within such chamber, means for transporting and for revolving such furnace, a container for fluid metal set within and spanning such chamber and extending through one wall and stationary regeneratively supplied firing means adapted to engage and disengage with ports in said chamber and produce and maintain a continuous, substantially unstratified and homogeneous flame therein.

5. In a ladle furnace, a transportable short and narrow furnace chamber having walls of refractory material within effective radiating reach of all points within such chamber, said chamber being further provided with a pair of ports adapted to engage with stationary regenerative firing means, and a container for fluid metal set within and spanning such chamber and extending through a wall thereof.

6. In a ladle furnace, a transportable tubular furnace chamber having walls of refractory material within effective radiating reach of all points within said chamber and being provided with firing ports at opposite ends adapted to engage with stationary regenerative firing means and a container for fluid metal set within and spanning such chamber and extending through a wall thereof.

7. In a melting furnace, the combination of a short narrow tubular furnace chamber having opposite end flame ports, means for revolving the same, a container for fluid metal fitting tightly through the side of the chamber and extending across the interior to the opposite side, and regeneratively supplied firing means engaging the opposite ends of said tubular chamber.

8. In a melting furnace, the combination of a short narrow tubular furnace chamber having opposite end flame ports, means for revolving the same, a container for fluid metal set through one side and extending across the interior to the opposite side, and firing means engaging opposite ends of said tubular chamber, said firing means comprising air-heating checkers and means for supplying sprayed oil.

9. In a melting furnace, a short narrow tubular furnace chamber having open ends adapted to engage and disengage with stationary regenerative firing means, means for removing and transporting said chamber, a container for fluid metal passing through one side of the chamber and spanning said chamber, and removable closures adapted to close said open ends when disengaged from said firing means.

In testimony whereof, we affix our signatures in the presence of witnesses.

WILLIAM M. CARR.
CHARLES H. SPEER.

Witnesses:
CHARLES G. NEAL,
GEO. D. IRONS.